(12) United States Patent
Paravisi et al.

(10) Patent No.: US 6,644,444 B1
(45) Date of Patent: Nov. 11, 2003

(54) RETAINER CLIP FOR BRAKE-PAD SUPPORT PINS

(75) Inventors: Marco Paravisi, Dalmine (IT); Fausto Gandolfi, Valbrembo (IT)

(73) Assignee: Freni Brembo S.p.A., Curno (IT)

( * ) Notice: Subject to any disclaimer, the term of this patent is extended or adjusted under 35 U.S.C. 154(b) by 0 days.

(21) Appl. No.: 10/149,937

(22) PCT Filed: Nov. 24, 2000

(86) PCT No.: PCT/EP00/11750

§ 371 (c)(1),
(2), (4) Date: Oct. 28, 2002

(87) PCT Pub. No.: WO01/44675

PCT Pub. Date: Jun. 21, 2001

(30) Foreign Application Priority Data

Dec. 16, 1999 (EP) .............................................. 99830781

(51) Int. Cl.$^7$ .............................................. F16D 55/22
(52) U.S. Cl. .................................. 188/73.38; 188/73.36
(58) Field of Search ........................... 188/73.31, 73.36, 188/73.37, 73.38

(56) References Cited

U.S. PATENT DOCUMENTS

| 4,027,749 A | * 6/1977 | Yamamoto et al. ........ 188/72.4 |
| 4,269,290 A | 5/1981 | Thiel |
| 4,881,623 A | * 11/1989 | Kondo ..................... 188/73.38 |
| 6,179,095 B1 | * 1/2001 | Weiler et al. ............ 188/73.38 |

FOREIGN PATENT DOCUMENTS

| DE | 20 24 102 | 12/1971 |
| DE | 25 36 619 | 2/1977 |
| GB | 1 359 989 | 7/1974 |
| GB | 1 443 544 | 7/1976 |

* cited by examiner

*Primary Examiner*—Christopher P. Schwartz
(74) *Attorney, Agent, or Firm*—Kenyon & Kenyon

(57) ABSTRACT

A retainer clip for brake-pad support pins of vehicle brake calipers, is provided, wherein at least one support pin that is supported removably by a caliper element, which is intended to hold the pads, and which has a safety device associated removably with the support pin to prevent the support pin from slipping out of the caliper element. The retainer clip has, for each support pin, a respective clip with an eye which can be mounted astride the support pin, wherein the eye extends around the support pin, the support pin having abutment means, for example, a larger diameter and a smaller diameter, for preventing relative axial sliding of the clip on the support pin in at least one direction, thereby preventing slipping of the support pin out of the caliper element.

14 Claims, 2 Drawing Sheets

RETAINER CLIP FOR BRAKE-PAD SUPPORT PINS

FIELD OF THE INVENTION

The present invention relates in general to brakes and, more particularly, to disk brakes, particularly but not exclusively for vehicles. More specifically, the invention relates to a safety device for brake-pad support pins or bolts.

BACKGROUND INFORMATION

In disk brakes, particularly of the type fitted in vehicles, the pads which bear linings of friction material are supported within a so-called caliper body with the ability to move away from and towards the disk surface or braking band when they are acted on by hydraulic or pneumatic cylinder-piston units so as to be able to perform the braking action when required. Pins or bolts are used for supporting the pads in the caliper body and extend through the caliper body and through through-holes provided in the pads, their ends engaging in seats provided for the purpose in the caliper body. These support pins are supported by the caliper body so as to be removable axially since they have to be removed to enable the pads to be replaced when they are worn. However, the pins must be prevented from slipping out of the caliper body accidentally when the vehicle is in motion since this would result in the correct operative positioning of the pads no longer being ensured.

According to a known solution, the pins supporting the pads are prevented from slipping out of the caliper body by means of safety split pins mounted substantially in the vicinity of one end of each support pin, each split pin having a first limb which can be fitted in a through-hole formed for the purpose in the support pin, transverse the axis thereof. The other limb of each split pin has a portion which is shaped to form an arc with a radius substantially corresponding to that of the support pin and which grips the support pin, when the split pin is mounted, to prevent the first limb from undesirably slipping out of the through-hole in the support pin.

Moreover, the caliper body has recesses which leave the support pins exposed in the region of the transverse through-holes formed therein and the split pins are housed in these recesses. The split pins thus come into abutment with the walls of the recesses, preventing the support pins from slipping out.

Clearly, once the split pins are fitted in the respective support pins, they are also fixed for rotation with the support pins about the axes thereof. When the vehicle is in motion and, in particular, each time braking takes place, vibrations are produced and are propagated to the pins supporting the pads. These support pins, which are housed substantially loosely in the caliper body, vibrate and tend to rotate about their own axes, also causing the respective split pins to rotate.

To prevent the rotation of the support pins causing the split pins to strike against portions of the caliper body, for example, against the edges of the recesses housing the split pins, the eyes of the split pins are bent so as to lie in a plane perpendicular to the plane in which their two limbs lie. When the split pins are fitted, their eyes thus lie substantially on an outer surface of the caliper body in the vicinity of the edges of the respective recesses.

This solution may have disadvantages since the rotations of the support pin about its own axis are transmitted to the split pins, causing them to knock or at least rub against the caliper body. In time, the split pins could deteriorate or break. Any breakage of the split pins is an event which could have disastrous consequences and is absolutely to be avoided.

SUMMARY OF THE INVENTION

The object of the present invention is therefore to provide a safety device for brake-pad support pins which does not have the above-mentioned disadvantages.

According to the present invention, this object has been achieved by a retainer clip for brake-pad support pins. In one embodiment, the brake-pad support pin is supported removably by a caliper element which is intended to hold the pads. The retainer clip is associated removably with at least one support pin to prevent the support pin from slipping out of the caliper element. The retainer clip of this embodiment comprises, for each support pin, at least one respective clip with an eye which can be mounted astride the support pin wherein the eye extends around the support pin, and in that the at least one support pin has abutment means for preventing relative axial sliding of the clip on the support pin in at least one direction, preventing slipping of the support pin out of the caliper element.

DETAILED DESCRIPTION

Figures 1, 2:
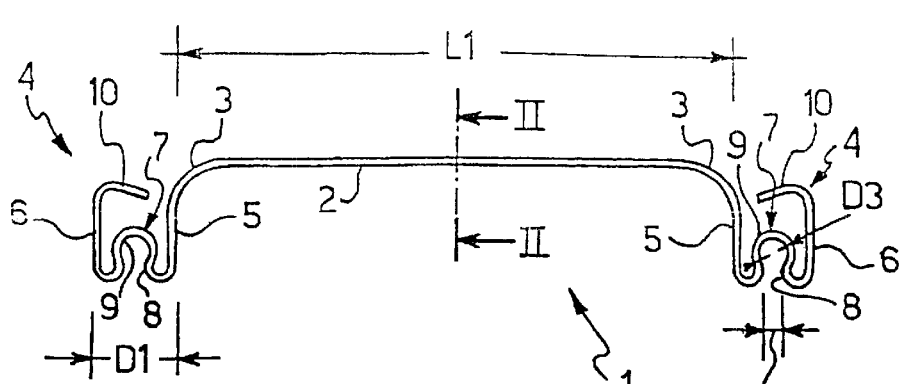
FIG. 1 shows an elevational view of a retainer clip as one embodiment of the invention.
FIG. 2 illustrates the cross section through the safety pin taken in the plane II—II of FIG. 1.

FIGS. 1 and 2 show, in an elevational view, and in a section taken in the plane II—II of FIG. 1, respectively, a retainer clip 1 forming part of a safety device according to a possible embodiment of the present invention. The retainer clip 1 is made of a metal wire suitably formed in the manner shown by the figures.

The metal wire of the embodiment shown in FIGS. 1 and 2 may be a wire made of steel, for example stainless steel and even more specifically AISI 302 steel. The metal wire of this embodiment has a circular cross-section of substantially uniform diameter along its length. The diameter of the steel wire is, for example, approximately 1.2 mm.

The retainer clip of this embodiment comprises a substantially straight central portion 2 of length L1. According to one embodiment, the length L1 of the central portion 2 is predominant compared to the overall length of the retainer clip. The central portion 2 has, at its two ends, two wide bends 3, the two wide bends having a radius of curvature, for example, of about 8 mm, and connect the central portion 2 to two lobes 4 which act as clips. The length L1 of the central portion is, for example, about 88–89 mm, although this value is given purely by way of example and may vary from one case to another according to the distance between the elements (for example, the interaxial spacing between the brake-pad support pins, as will become clear from the following) on which the safety pin is to be mounted.

Each lobe 4 of this embodiment comprises a first limb 5 and a second limb 6 coplanar with the central portion 2 and perpendicular thereto, the first and second limbs 5, 6 being of substantially equal length and significantly shorter than the central portion, and being spaced apart by a distance D1, for example, about 14 mm. The wire constituting the retainer clip is formed, between the first limb and the second limb in a substantially "Ω"-shaped, reentrant loop 7, referred to herein as an eye, which has a narrow opening 8 also referred to herein as an aperture, having an aperture opening length D2 and then the eye widens out into a circular portion 9 having an inside diameter D3, wherein the inside diameter is greater than the aperture opening length. For example, in one embodiment the aperture opening length D2 is about 3 mm, and the inside diameter D3 of the circular portion 9 is about 4.6 mm. As already stated for the central portion length L1, the inside diameter and the aperture opening length may be selected according to the dimensions of the elements on which the safety pin is to be mounted.

The end of the second limb 6 of this embodiment of each clip 4 is bent and extends towards the first limb 5 forming an appendage 10, which can be gripped manually or by means of a tool and which is inclined slightly towards the eye 7 so as to prevent the end of the metal wire from projecting dangerously.

The clip-like behaviour of the lobes 4 is made possible by the resilient behaviour of the metal wire of the retainer clip of this embodiment and, in particular, by the ability of the circular portion 9 to bend under stress and to become wider, and of the limbs 6 to bend and/or to be inclined, under stress, towards the respective adjacent limbs 5, so as to bring about a temporary widening of the apertures D2 of the narrower portions 8 and then to return resiliently to the rest position when the stress is removed. The stress may be a stress applied directly to the narrower portions 8 by forcing the retainer clip 1 astride the elements, such as the support pin or bolt, which are to be prevented from slipping out. In the case of forcing the retainer clip onto a support pin, the circular portions 9 bend and widen and the limbs 6 are inclined towards the respective limbs 5. Alternatively, the stress may be a stress applied to the ends of the limbs 6, for example, by pulling on the appendages 10, as occurs when the safety pin is to be removed from the elements, for example, to allow them to slip out; in this case, the limbs 6 bend and are inclined towards the respective limbs 5 and the circular portion 9 in turn bends, bringing about a temporary widening of the narrower portion 8. Clearly, the resiliency or flexibility of the lobes 4 depends on a combination of factors, amongst which are the particular material of which the metal wire, the diameter of the metal wire, the inner diameter of the circular portion 9 of the eye of the lobes 4, and other factors known to one of ordinary skill in the art. More specifically, once the material to be used and the minimum desired "extraction load" (that is, the tensile force to be exerted on the safety pin in order to disconnect the clips 4 from the elements on which they are mounted) has been established, the principal dimensions of the clips 4 will consequently be determined. The values provided by way of example in this embodiment are suitable for ensuring a minimum extraction load of about 20 N, for a retainer clip made of AISI 302 steel having a diameter of the metal wire of 1.2 mm.

Figure 3:
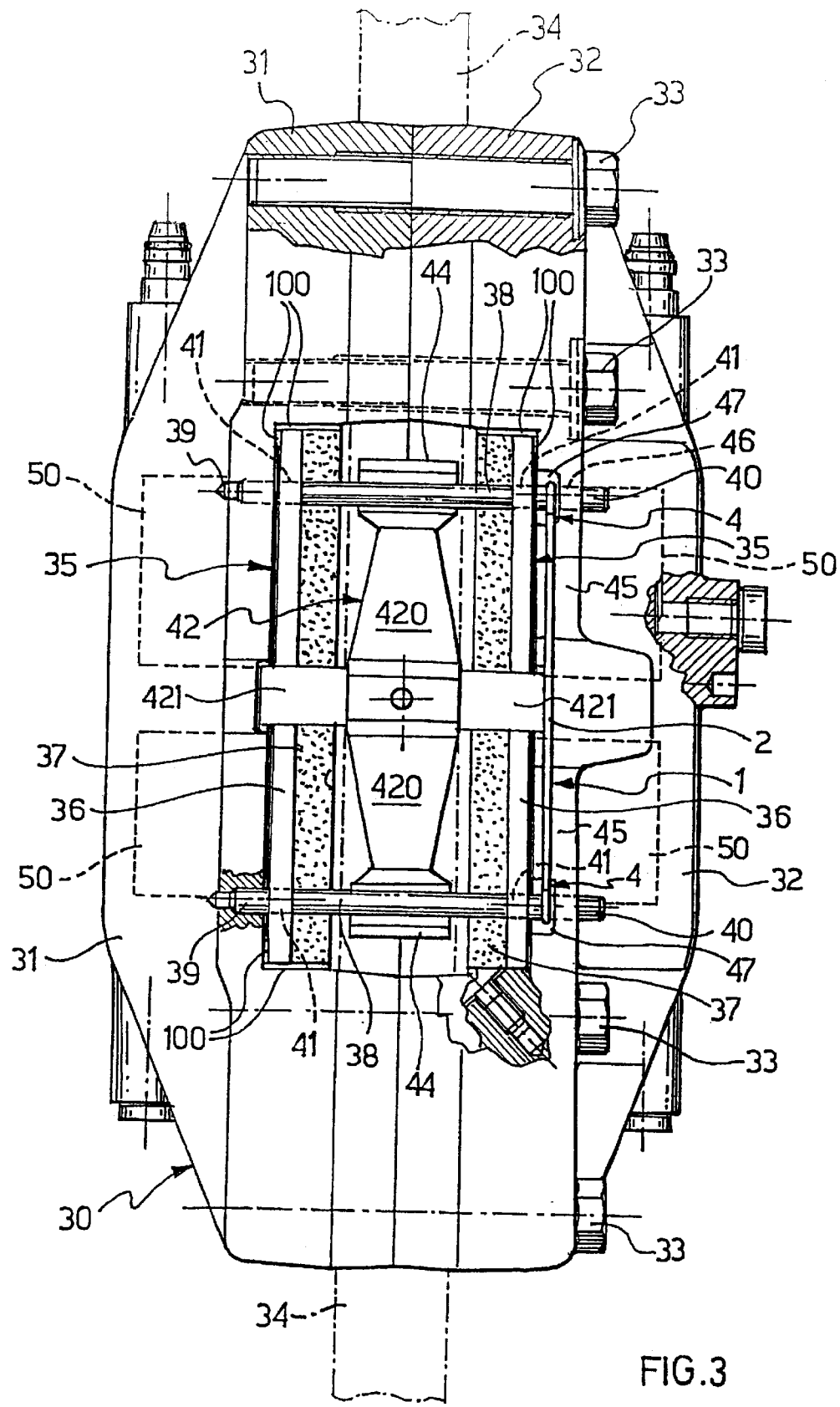
FIG. 3 illustrates a plan view of a vehicle disk-brake caliper according to one embodiment of the invention.

FIG. 3 shows an embodiment of a vehicle disk-brake caliper in a plan view. The caliper comprises a caliper body 30, which, in the embodiment shown, is formed by two juxtaposed half-bodies 31 and 32 fastened together by screws 33, but which could alternatively be constituted by a single element. The caliper body extends astride a portion of a braking band of a disk 34, which is shown schematically. Seats 100 are formed in the caliper body 30 for housing two brake pads 35 of friction material disposed on either side of the disk 34. Each brake pad 35 comprises a plate 36 supporting a lining 37 of friction material facing towards the braking band of the disk 34. The pads are fastened and positioned in the correct operative positions in the respective seats by support means such as support pins or bolts.

Cylinder-piston pairs operated, for example, hydraulically, are formed in the two half-bodies 31 and 32, in known manner, in order to urge the pads 35 towards the two sides of the braking band of the disk 34 so that the linings 37 of friction material come into contact with the braking band. In FIG. 3, four cylinder-piston pairs 50, that is, two for each half-body 31, 32, are shown schematically.

The means for supporting the pads 35 comprise a pair of support pins or bolts 38 which are arranged transversely relative to the caliper body and the opposed ends 39, 40 of which are held by being fitted substantially loosely in respective seats provided in the caliper body 30. In a specific embodiment, on the side formed by the half-body 31, the seats for the ends of the support pins 38 are two blind holes or, alternatively, through-holes with stop abutments for the support pins, and on the side formed by the half-body 32, two through-holes 46 are formed in a shoulder 45 of the half-body 32. The support pins 38 extend through through-holes 41 provided for the purpose in the plates 36 of the pads 35, thus supporting the pads 35 and ensuring their correct operative positioning. A cross-shaped spring 42 comprises a spring portion 420 which extends longitudinally relative to the caliper body 30 and a spring portion 421 arranged transversely relative to the spring portion 420 and operatively connected, for example riveted, thereto. The spring portion 421 urges the pads 35 away from the disk 34, that is, towards the respective cylinder-piston units 50 so that, when the braking action is not exerted, the pads are forced away from the braking band by the springs. The two ends 44 of the cross-shaped spring 42, on the other hand, extend beneath the two support pins 38.

Two recesses 47 formed in the shoulder 45 of the half-body 32 on the side facing inwardly, that is, towards the pads 35, in the region of the through-holes 46, are open on the side facing towards the pads 35. The two recesses 47 can house the two lobes 4 of the retainer clip 1 after the retainer clip 1 has been mounted astride the two support pins 38. The central portion 2 of the retainer clip 1 extends between the two support pins 38, remaining slightly above the shoulder 45 of the half-body 32. It can be seen that, although in the embodiment shown the two recesses 47 are open towards the pads 35, these recesses could alternatively be formed as open-topped grooves, closed at the bottom and at the sides, and wide enough to allow the lobes of the retainer clip to be inserted.

Figure 4:
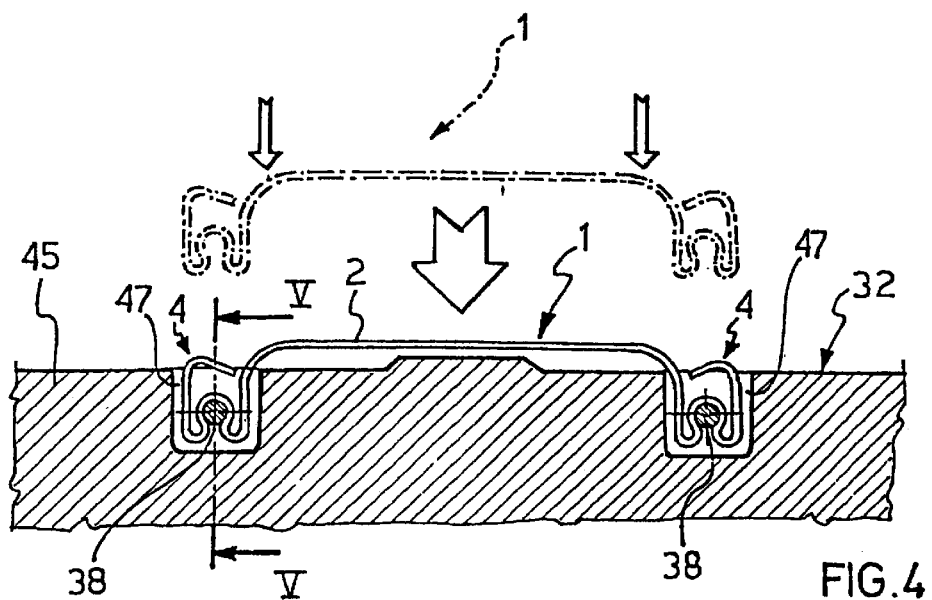
FIG. 4 shows an elevational view of a detail of the caliper of FIG. 3, showing the stages of the fitting of the safety pin.
Figure 5:
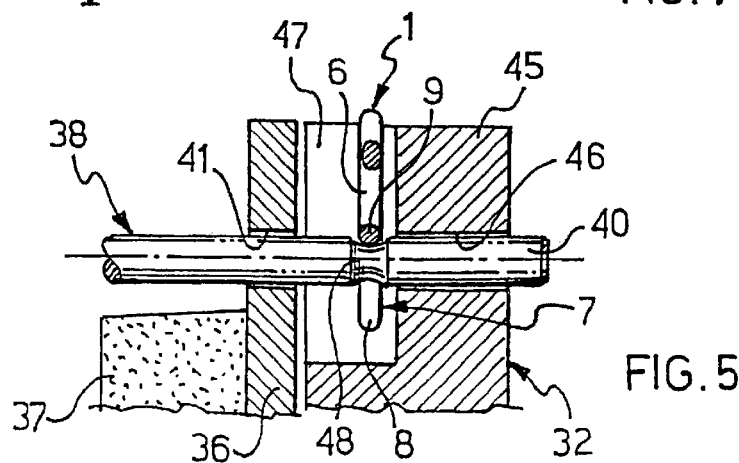
FIG. 5 illustrates a cross section taken in the plane V—V of FIG. 4.

With reference to the embodiment illustrated by FIGS. 4 and 5, the support pins 38 each have peripheral grooves 48 in the vicinity of their ends 40. In one possible embodiment, the safety pins have a peripheral groove diameter slightly greater than the inside diameter D3 of the circular portion 9 of the eye 7, and the peripheral groove diameter is smaller than the outer diameter of the support pins 38, wherein once the clips 4 have been mounted astride the support pins 38 in the region of their grooves 48, there is slight force applied by the eyes 7 on the support pins. In an alternative embodiment, the safety pins have a peripheral groove diameter that is slightly less than the inside diameter D3 of the circular portion 9 of the eye 7 such that the lobes 4 are mounted astride the grooves 48 of the support pins 38 with a slight clearance between the peripheral grooves and the lobes. The aperture opening distance D2 of the narrow opening 8 is less than the peripheral groove diameter of the support pins 38 wherein the lobes 4 of the retainer clip do not slip off the support pins 38 accidentally once they have been mounted thereon. The values given above by way of example for the most important dimensions of the retainer clip are suitable for use with support pins having a maximum diameter of at least approximately 6 mm and a diameter in the grooves 48 of about 4.7–4.8 mm, and relate to a situation in which the safety pins are required to be mounted astride the support pins with a slight force applied by the eyes on the support pins. It may be clear to one of ordinary skill in the art that the dimensions of the retainer clip may be modified to adapt them to support pins of different diameters.

In order to mount the retainer clip, it suffices to proceed as shown schematically in FIG. 4, by positioning the retainer clip so that the eyes 7 are disposed adjacent the grooves 48 of the support pins and then to push the retainer clip onto the support pins 38 so that the aperture opening distance D2 of the narrow openings 8 are widened sufficiently, owing to bending of the circular portions 9 of the eyes 7, for the support pins to pass through the narrow openings 8 and to snap into the circular portions 9 of the eyes 7. The lobes 4 are thus mounted astride the support pins 38.

When the retainer clip is mounted astride the support pins 38, the support pins 38 are prevented from slipping out of their seats in the caliper body and the support of the pads 35 is thus ensured. However, since in one embodiment the eyes 7 of the retainer clip apply a slight force to the support pins 38, or in an alternative embodiment have a slight clearance between the peripheral grooves and the lobes, the support pins 38 may rotate as a result of vibrations generated when the vehicle is in motion, and especially during braking, without unavoidably resulting in rotation of the retainer clip 1 which is not fixed relative to the support pins but merely restrains them from slipping out axially. The fact that the support pins can rotate without the retainer clip rotating means that the retainer clip is not subjected to repeated knocking against the caliper body or other parts of the brake and is therefore not subject to breakages over time. This is also due to the fact that the retainer clip extends astride and is mounted on both of the support pins.

In order to remove the retainer clip, for example, when the pads 35 need to be replaced, it suffices to exert a pull on the appendages 10 of the safety pin until the eyes 7 of the safety pin snap out of grooves 48 of the respective support pins 38. Alternatively, one can, at the same time, push the second limb 6 towards the first limb 5 so as to bend the circular portions 9, consequently widening the aperture opening diameter D2 of the narrow opening 8 of the eyes 7.

In the foregoing description, a so-called fixed caliper is referred to purely by way of example. Clearly the present invention may also be applied to calipers of other kinds, for example, to so-called floating calipers, in which at least one bolt or pin is nevertheless used for supporting the pads; these may either be calipers of the type having a support for housing the pads which is separate from but operatively connected to an actual caliper body, or of the type which does not have such a separate support.

Similarly, the invention is also applicable when the number of pins supporting the pads is other than two, possibly even when there is only one support pin.

Naturally, variants and or additions may be applied to the embodiment described and illustrated above without thereby departing from the scope of protection defined in the appended claims.

What is claimed is:

1. A retainer clip for brake-pad support pins of vehicle brake calipers, the support pins each having a structural abutment, the retainer clip comprising:
   a central portion having opposite ends;
   at least two wide bends;
   at least two lobes, wherein the at least two lobes are connected to the opposite ends of the central portion by the at least two wide bends, and wherein the central portion, the at least two wide bends, and the at least two lobes are formed from a single metal wire, and wherein each of the at least two lobes includes:
   a first limb connected to one of the at least two wide bends;
   a second limb; and
   an eye, wherein the eye connects the first limb to the second limb, and wherein the eye is formed with a narrow opening having an aperture opening distance, and a circular portion having an inner diameter, wherein the aperture opening distance is less than the inner diameter of the circular portion, and wherein the inner diameter of the circular portion of each of the at least two lobes is less than the size of the structural abutment, wherein each of the at least two lobes abuts the structural abutment of the respective support pin, thereby preventing relative axial sliding in at least one direction between the retainer clip and the support pins.

2. A retainer clip according to claim 1, wherein the structural abutment of each of the support pins comprises a larger portion with a larger diameter and a smaller portion with a smaller diameter, wherein the inner diameter of the circular portion is less than the larger diameter of the support pins, and wherein, when the retainer clip is mounted on the support pins, the at least two lobes are mounted astride the support pins at the smaller portion of the support pins, and wherein the larger portion of the support pins abuts the at least two lobes, thereby preventing relative axial sliding in at least one direction between the retainer clip and the support pins.

3. A retainer clip according to claim 2, wherein the inner diameter of the circular portion of the at least two lobes is slightly less than the smaller diameter of the support pins, wherein there is a slight force applied by the eyes of the at least two lobes on the support pins, when mounted, and wherein the metal wire is resilient, allowing the aperture opening distance to be widened resiliently during mounting of the retainer clip on the support pins and during removing of the retainer clip from the support pins.

4. A retainer clip according to claim 3, wherein the second limb of each of the at least two lobes terminates in an appendage that can be acted on to resiliently widen the aperture opening distance.

5. A retainer clip according to claim 2, wherein the inner diameter of the circular portion of the at least two lobes is slightly greater than the smaller diameter of the smaller portion of the support pins whereby there is clearance between the eyes of the at least two lobes and the smaller portion of the support pins, and wherein the aperture opening distance of the narrow opening is less than the smaller diameter of the support pins, and wherein the metal wire is resilient, thereby allowing the aperture opening distance to be widened resiliently during mounting of the retainer clip on the support pins and during removing of the retainer clip from the support pins.

6. A retainer clip according to claim 5, wherein the second limb of each of the at least two lobes terminates in an appendage that can be acted on to resiliently widen the aperture opening distance.

7. A vehicle brake caliper for a disk brake including the retainer clip of claim 2.

8. The vehicle brake caliper according to claim 7, wherein the inner diameter of the circular portion of the at least two lobes of the retainer clip is slightly less than the smaller diameter of the support pins, when mounted, wherein there is a slight force applied by the eyes of the at least two lobes on the support pins, and wherein the metal wire is resilient, allowing the aperture opening distance to be widened resiliently during mounting of the retainer clip on the support pins and during removing of the retainer clip from the support pins.

9. The vehicle brake caliper according to claim 7, wherein the inner diameter of the circular portion of the at least two lobes is slightly greater than the smaller diameter of the smaller portion of the support pins whereby there is clearance between the eyes of the at least two lobes and the smaller portion of the support pins, and wherein the aperture opening distance of the narrow opening is less than the smaller diameter of the support pins, and wherein the metal wire is resilient, thereby allowing the aperture opening distance to be widened resiliently during mounting of the retainer clip on the support pins and during removing of the retainer clip from the support pins.

10. A retainer clip according to claim 2, wherein the vehicle brake calipers have at least one structural wall, wherein the retainer clip, in cooperation with the at least one wall of the vehicle brake calipers, prevents the support pins from slipping out of the vehicle brake calipers.

11. A retainer clip according to claim 2, wherein the smaller portion of each of the support pins comprises a peripheral groove.

12. A retainer clip according to claim 11, wherein the vehicle brake calipers have at least one structural wall, wherein the retainer clip, in cooperation with the at least one wall of the vehicle brake calipers, prevents the support pins from slipping out of the vehicle brake calipers.

13. A retainer clip according to claim 1, wherein the vehicle brake calipers have at least one structural wall, wherein the retainer clip, in cooperation with the at least one wall of the vehicle brake calipers, prevents the support pins from slipping out of the vehicle brake calipers.

14. A vehicle brake caliper for a disk brake including the retainer clip of claim 1.

* * * * *